United States Patent
Salenbien

(10) Patent No.: US 9,758,070 B1
(45) Date of Patent: Sep. 12, 2017

(54) SECOND ROW FLIP UP CUSHION INERTIA HOOK

(71) Applicant: FORD GLOBAL TECHNOLOGIES, LLC, Dearborn, MI (US)

(72) Inventor: Nicholas Salenbien, Dundee, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/178,659

(22) Filed: Jun. 10, 2016

(51) Int. Cl.
*B60N 2/42* (2006.01)
*B60N 2/30* (2006.01)
*B60N 2/68* (2006.01)
*B60N 2/36* (2006.01)

(52) U.S. Cl.
CPC ............. *B60N 2/305* (2013.01); *B60N 2/36* (2013.01); *B60N 2/4221* (2013.01); *B60N 2/682* (2013.01)

(58) Field of Classification Search
CPC ........ B60N 2/305; B60N 2/36; B60N 2/4221; B60N 2/682
See application file for complete search history.

(56) References Cited

U.S. PATENT DOCUMENTS

| | | | |
|---|---|---|---|
| 2,873,794 A | 2/1959 | Leslie et al. | |
| 4,118,067 A * | 10/1978 | Tanaka | B60N 2/433 297/378.11 |
| 4,252,370 A | 2/1981 | Kluting et al. | |
| 4,318,569 A | 3/1982 | Bilenchi et al. | |
| 4,365,838 A | 12/1982 | Berg | |
| 4,707,010 A * | 11/1987 | Croft | B60N 2/433 297/378.11 |
| 4,909,571 A | 3/1990 | Vidwans et al. | |
| 4,988,134 A | 1/1991 | Vidwans et al. | |
| 6,012,771 A | 1/2000 | Shea | |
| 6,655,724 B1 | 12/2003 | Yoshino et al. | |
| 7,780,234 B2 | 8/2010 | Grable et al. | |

FOREIGN PATENT DOCUMENTS

| | | | |
|---|---|---|---|
| EP | 0 978 414 | 2/2000 | |
| EP | 1 407 923 A1 | 4/2004 | |
| JP | EP 1407923 A1 * | 4/2004 | ........... B60N 2/3013 |

* cited by examiner

*Primary Examiner* — Pinel Romain
(74) *Attorney, Agent, or Firm* — Vichit Chea; Price Heneveld LLP

(57) ABSTRACT

A seating assembly for a motor vehicle comprises a flip up lower seat cushion having a design seating position and a structural member having a forward edge pivotally coupled with a floor and a rearward edge disposed proximate a seat frame. A cushion stop assembly is disposed on the structural member and disposed proximate the rearward edge of the structural member. The cushion stop assembly has a catch and an actuator. An inertia hook is pivotally mounted to the seat frame comprising a hook member and a hook stop, the inertia hook further having a first hook position when the actuator acts upon the hook stop to rotate the hook member into vertical alignment with the catch and a second hook position when the actuator is lifted away from the hook stop and the hook member rotates out of vertical alignment with the catch.

20 Claims, 11 Drawing Sheets

SECOND ROW FLIP UP CUSHION INERTIA HOOK

FIELD OF THE INVENTION

The present disclosure generally relates to a motor vehicle seating assembly, and more particularly, to a seating assembly having a flip up lower seat cushion having a design seating position and an upright forward flipped position, where a hook member is in selective vertical alignment with a catch to prevent the flip up lower seat cushion from flipping up and forward during a frontal impact event.

BACKGROUND OF THE INVENTION

Motor vehicles manufacturers often employ multiple rows of seating assemblies in motor vehicles. In the case of second row seating assemblies and those seating assemblies rearward, it is often desirable that the seat assembly be capable of being configured to multiple positions in order to maximize usage of the vehicle depending upon the need to carry passengers or cargo. In some cases, second row and further rearward seating assemblies have been provided with so-called flip up lower seat cushions that are provided with a pivotal connection at a forward edge that allows the flip up lower seat cushion to rotate about the pivotable connection and flip upwardly and forwardly when not in use by a passenger. Flipping the flip up lower seat cushion upwardly and forwardly exposes a substantially flat load floor in the vehicle for the transport of cargo, particularly bulky items, and in some cases allows the seat back to be folded forward to a substantially flat position. However, when the flip up lower seat cushion is in the design seating position, that is, when the flip up lower seat cushion is configured to support a passenger but is yet unoccupied, the flip up lower seat cushion could potentially and undesirably flip up and forward as a consequence of a frontal impact event. An improvement over such seating assemblies systems having a flip up lower seat cushion was desired.

SUMMARY OF THE INVENTION

According to one aspect of the present disclosure, a seating assembly for a motor vehicle comprises a seat frame attached to a floor of the motor vehicle, a flip up lower seat cushion having a design seating position and an upright forward flipped position comprising a structural member having a forward edge pivotally coupled with the floor and a rearward edge disposed proximate the seat frame. A cushion stop assembly is disposed on the structural member of the flip up lower seat cushion and disposed proximate the rearward edge of the structural member of the flip up lower seat cushion. The cushion stop assembly has a catch and an actuator. An inertia hook is pivotally mounted to the seat frame comprising a hook member and a hook stop, the inertia hook further having a first hook position when the actuator acts upon the hook stop to rotate the hook member into vertical alignment with the catch and a second hook position when the actuator is lifted away from the hook stop and the hook member rotates out of vertical alignment with the catch.

According to a further aspect of the present disclosure, a seating assembly comprises a structural member pivotally anchored at a forward edge, and a catch and an actuator disposed proximate a rearward edge of the structural member. An inertia hook mounted to a stationary seat frame has a first position wherein the actuator urges a hook member into vertical alignment with the catch and a second position wherein the actuator is lifted and the hook member rotates out of vertical alignment with the catch.

According to another aspect of the present disclosure, a seating assembly for a motor vehicle comprises a seat frame attached to a floor of the motor vehicle, a flip up lower seat cushion structural member having a forward edge pivotally coupled with the motor vehicle and a rearward edge disposed proximate the seat frame, and a cushion stop assembly disposed on and proximate the rearward edge of the flip up lower seat cushion structural member, the cushion stop assembly having a catch and actuator. An inertia hook is pivotally mounted to the seat frame by an inertia hook pivot, wherein the inertia hook has a hook stop disposed rearward of the inertia hook pivot and a center of gravity disposed forward of the inertia hook pivot, and wherein the actuator has a first position in contact with and acting upon the hook stop to rotate a hook member into vertical alignment with the catch and a second position wherein the actuator is lifted away from the hook stop to rotate the hook member out of vertical alignment with the catch.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
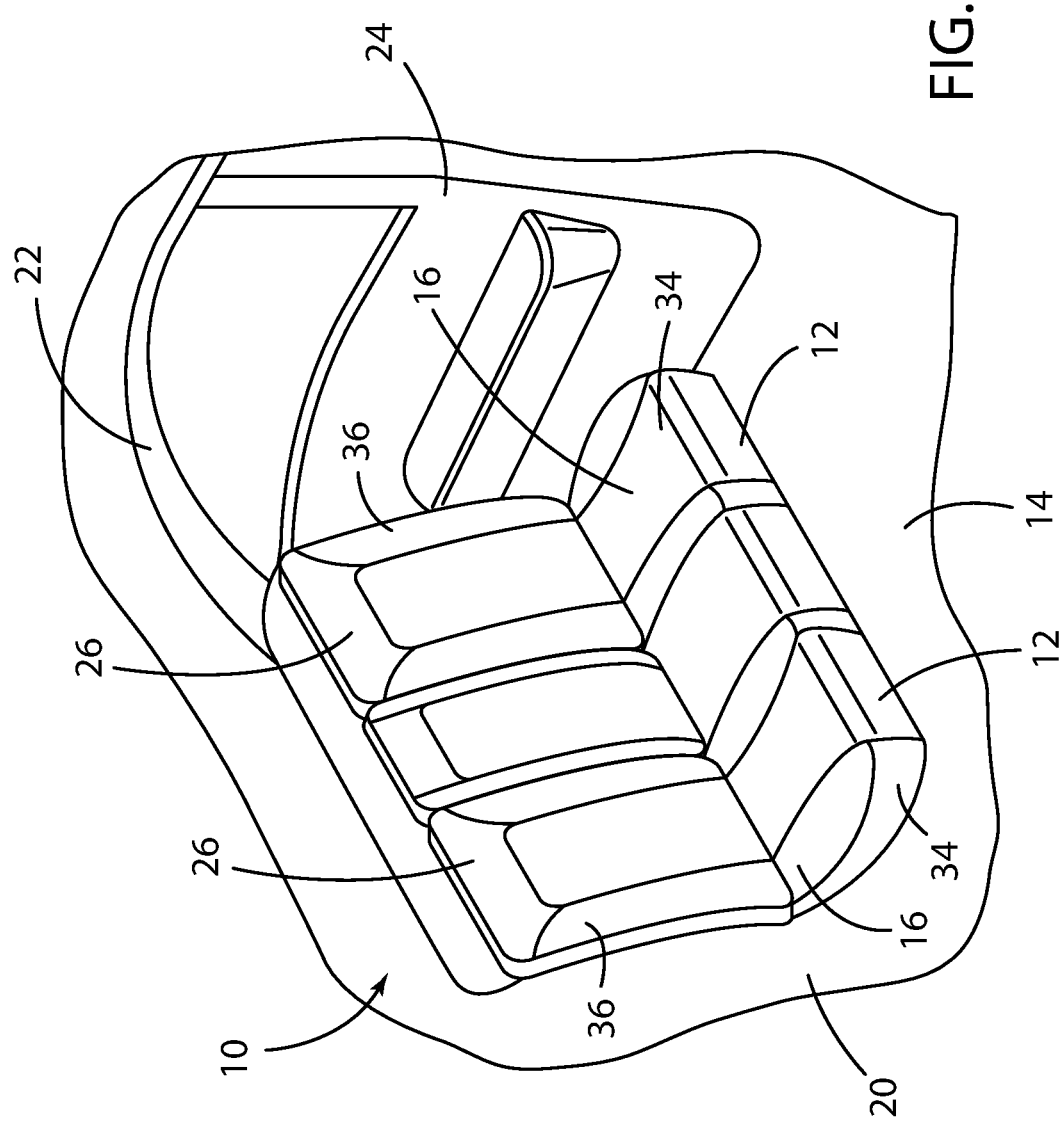
FIG. 1 is a front side perspective view of a second row seating assembly having a flip up lower seat cushion according to the present disclosure, where the flip up lower seat cushion is in its design seating position capable of supporting a passenger.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 2:
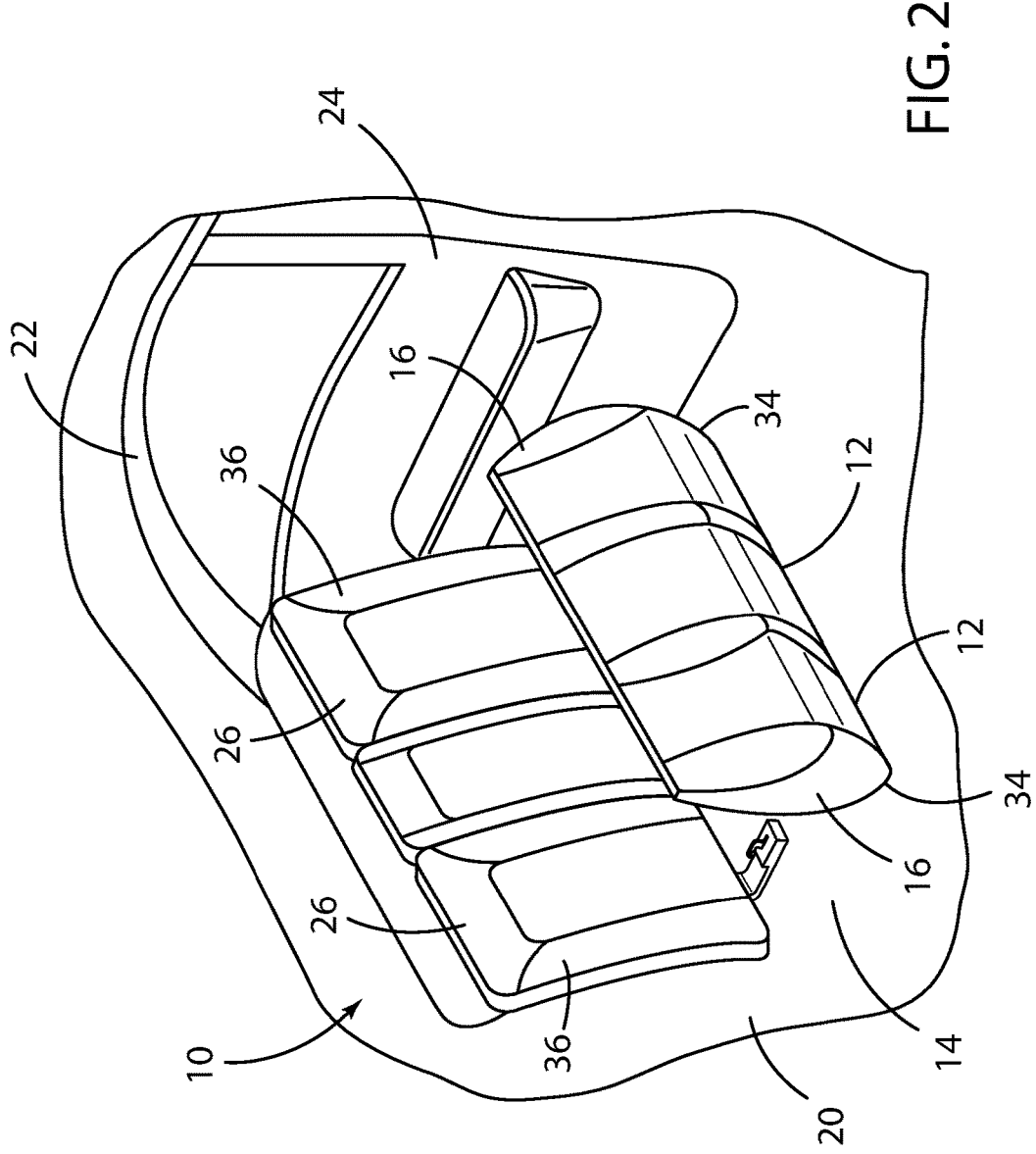
FIG. 2 is a front side perspective view of the second row seating assembly having a flip up lower seat cushion of FIG. 1 according to the present disclosure, where the flip up lower seat cushion is in a flipped up and forward position to create a relatively flat cargo floor.

Referring to FIGS. 1 and 2, reference numeral 10 generally designates a second row seating assembly having a flip up lower seat cushion 12 in accordance with the present disclosure. As best seen in FIG. 2, the seating assembly 10 of the present disclosure provides an easy to use flip up lower seat cushion 12, where the flip up lower seat cushion 12 in its design seating position, or normal use position shown in FIG. 1, is capable of supporting a passenger. As disclosed further below, the flip up lower seat cushion 12 may be readily moved from its design seating position to a flipped up forward position to create a relatively flat cargo floor 14, without the need to actuate a release button or lever, simply by lifting a rear portion 16 of the flip up lower seat cushion 12. The disclosed second row seating assembly 10 also includes an inertia hook 18 that catches the flip up lower seat cushion 12 during a frontal impact event when in its design seating position and prevents the flip up lower seat cushion 12 from undesirably flipping forward.

The seating assembly 10 according to the present disclosure is primarily intended for second, third, or additional rows commonly installed rearward of the forward passenger seats (not shown). Such seating assemblies are not always required and may from time to time be advantageously stowed in order to make room for cargo. However, the present disclosure should not be interpreted to exclude the disclosed seating assembly 10 from a forward passenger seat application.

As shown in the Figures, the second row seating assembly 10 is installed toward the rear 20 of the motor vehicle 22, typically proximate a rear side door 24. As better shown in FIGS. 3 and 4, the flip up lower seat cushion 12 and an upwardly extending seat back cushion 26 of the second row seating assembly 10 include a lower seat cushion structural member 28 and an upwardly extending seat back cushion structural member 30, the latter arranged about and mounted in pivotable relation to a seat frame 32 preferably extending substantially across the width of the motor vehicle 22. The structural members are preferably formed from stamped steel or aluminum sheets. Upholstered exterior portions 34, 36 are supported by each of the structural members of the flip up lower seat cushion 12 and the seat back structural member, respectively, as shown in FIGS. 1-2.

Preferably, both the flip up lower seat cushion 12 and the upwardly extending seat back cushion 26 are divided into separate flip up lower seat cushion side portions 38, 40 and separate upwardly extending seat back cushion portions 42, 44, representing approximately 40% and 60% of the overall width of the second row seating assembly 10, as shown. Such a split seat configuration has been found to advantageously provide flexibility and allows one side portion 40, 44 of the second row seating assembly 10 to remain in the design seating position configuration to support a passenger, but also allow the other side portion 38, 42 to be folded into its flipped up forward storage configuration, as further described below.

Figure 3:
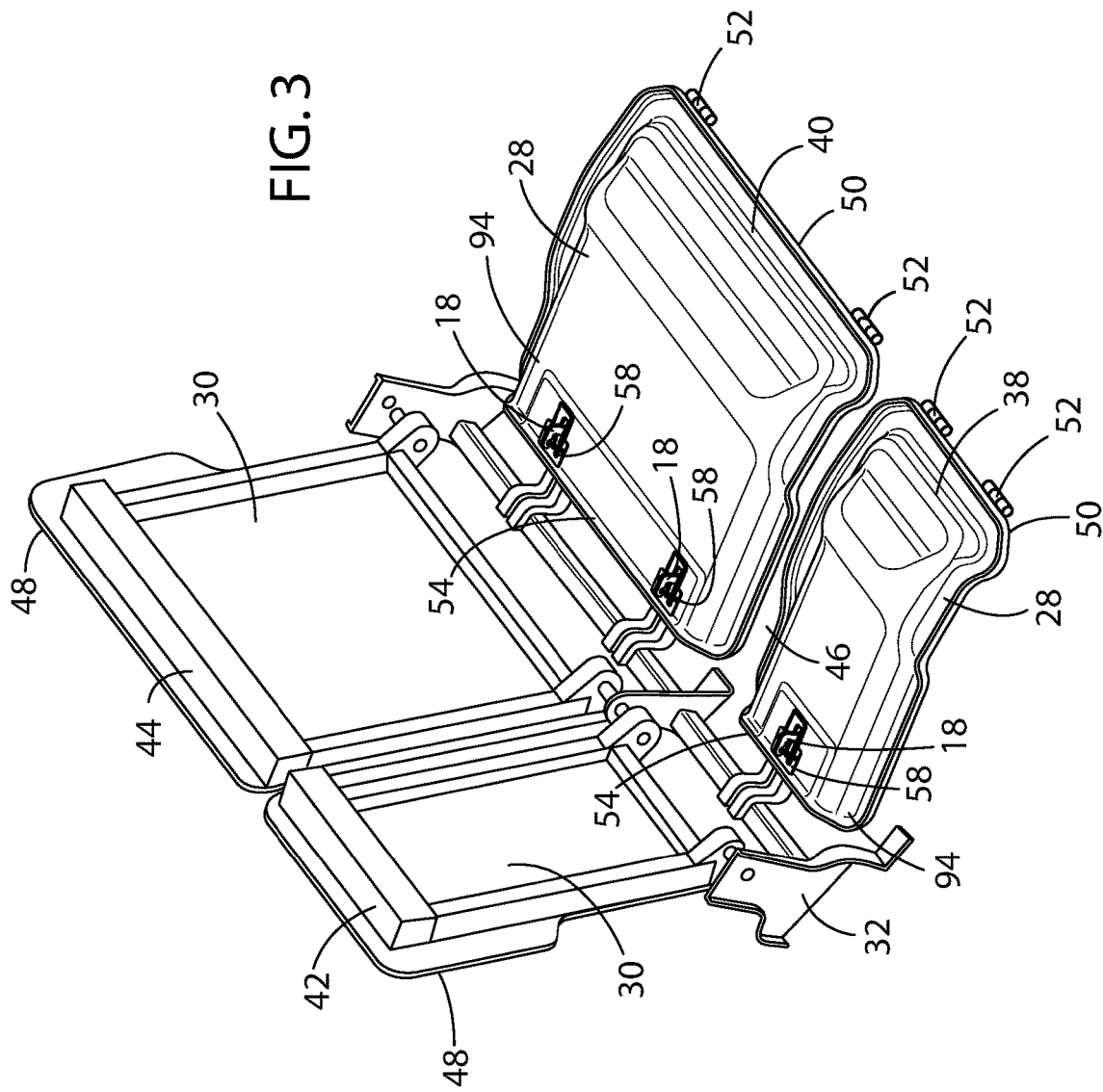
FIG. 3 is a front side perspective view of the structural members of the second row seating assembly having a flip up lower seat cushion according to the present disclosure, where the flip up lower seat cushion is in its design seating position capable of supporting a passenger.
Figure 4:
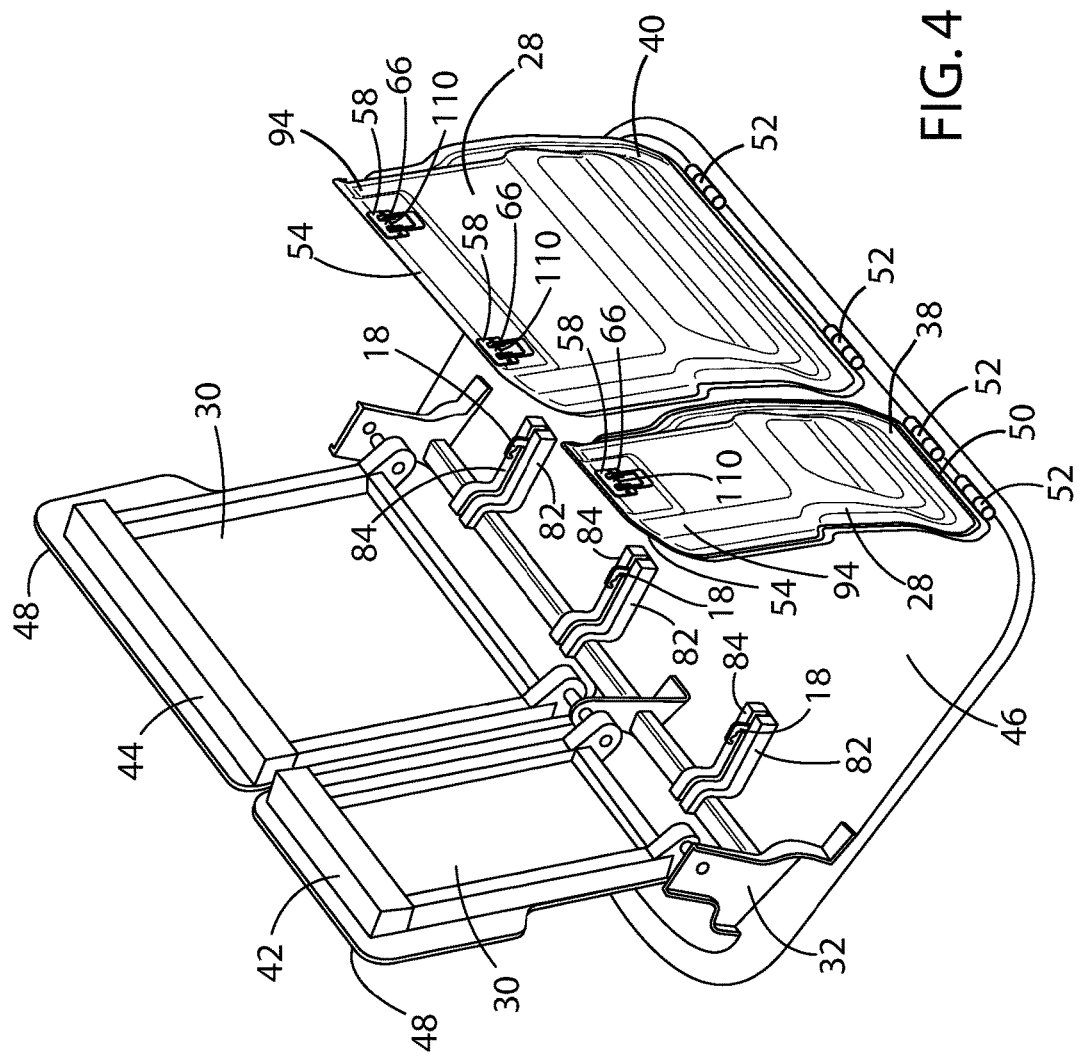
FIG. 4 is a front side perspective view of the structural members of the second row seating assembly having a flip up lower seat cushion of FIG. 1 according to the present disclosure, where the flip up lower seat cushion is in a flipped up and forward position to create a relatively flat cargo floor.
Figure 7:
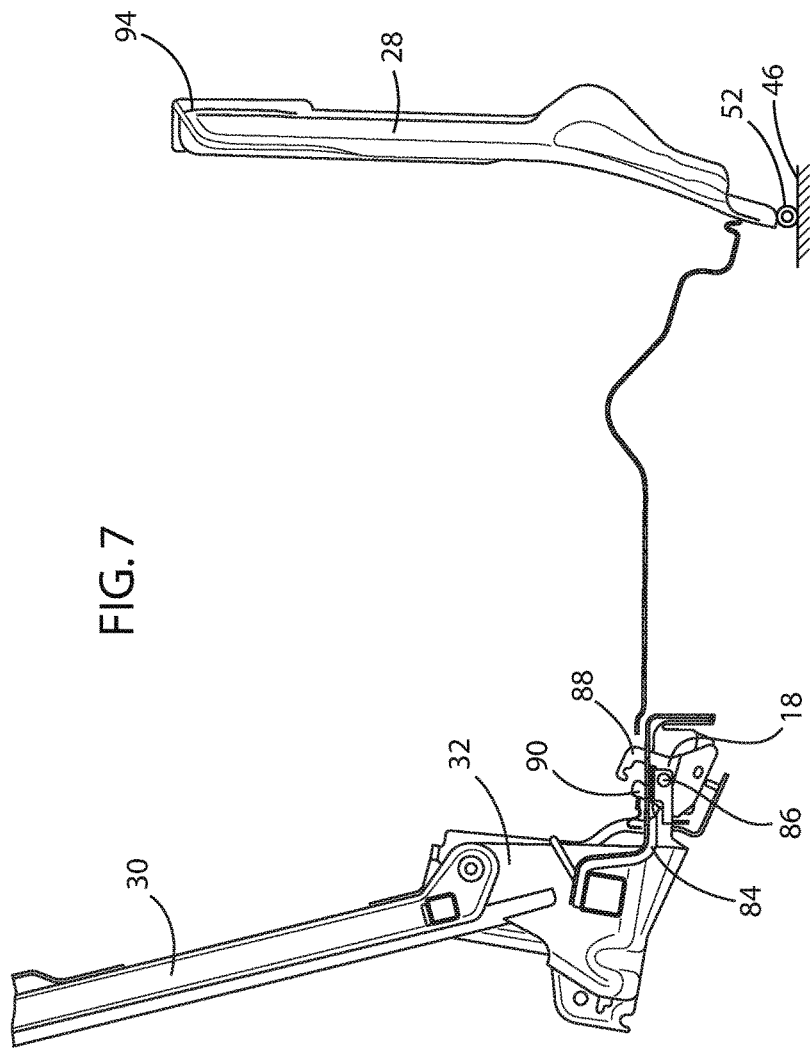
FIG. 7 is a cross-sectional view of the structural member of the flip up lower seat cushion of FIG. 1 according to the present disclosure along the lines VI-VI shown in FIG. 6, where the flip up lower seat cushion has fully lifted up from its design seating position and the inertia hook has rotated out of an engagement position to a release position.

The structural member 28 of the flip up lower seat cushion 12 is shown in FIG. 3 in its design seating position, capable of supporting a passenger. However, as shown in FIG. 4, the flip up lower seat cushion 12 may be placed in a flipped up forward position to create a relatively flat cargo floor 46, as shown in FIG. 7. Additionally, as is the case in some configurations, the upwardly extending seat back cushion 26 can then be folded forward into a relatively flat position to allow cargo and other items to be placed on a back surface 48 of the normally upwardly extending seat back cushion 26, as is commonly known to those having skill in the art.

Preferably, the structural member 28 of the flip up lower seat cushion 12 has a forward edge 50 pivotally coupled with the floor 46 of the motor vehicle 22 by one or more pivots 52. A rearward edge 54 is disposed proximate the seat frame 32 and the upwardly extending seat back cushion 26. An opening 56 is preferably disposed mid-width through the structural member 28 of the flip up lower seat cushion 12 proximate the rearward edge 54 of the structural member 28 of the flip up lower seat cushion 12. A cushion stop assembly 58 is disposed on the structural member 28 of the flip up lower seat cushion 12 and is also preferably disposed proximate the rearward edge 54 of the structural member 28 of the flip up lower seat cushion 12, as shown in FIGS. 3-5.

Figure 5:
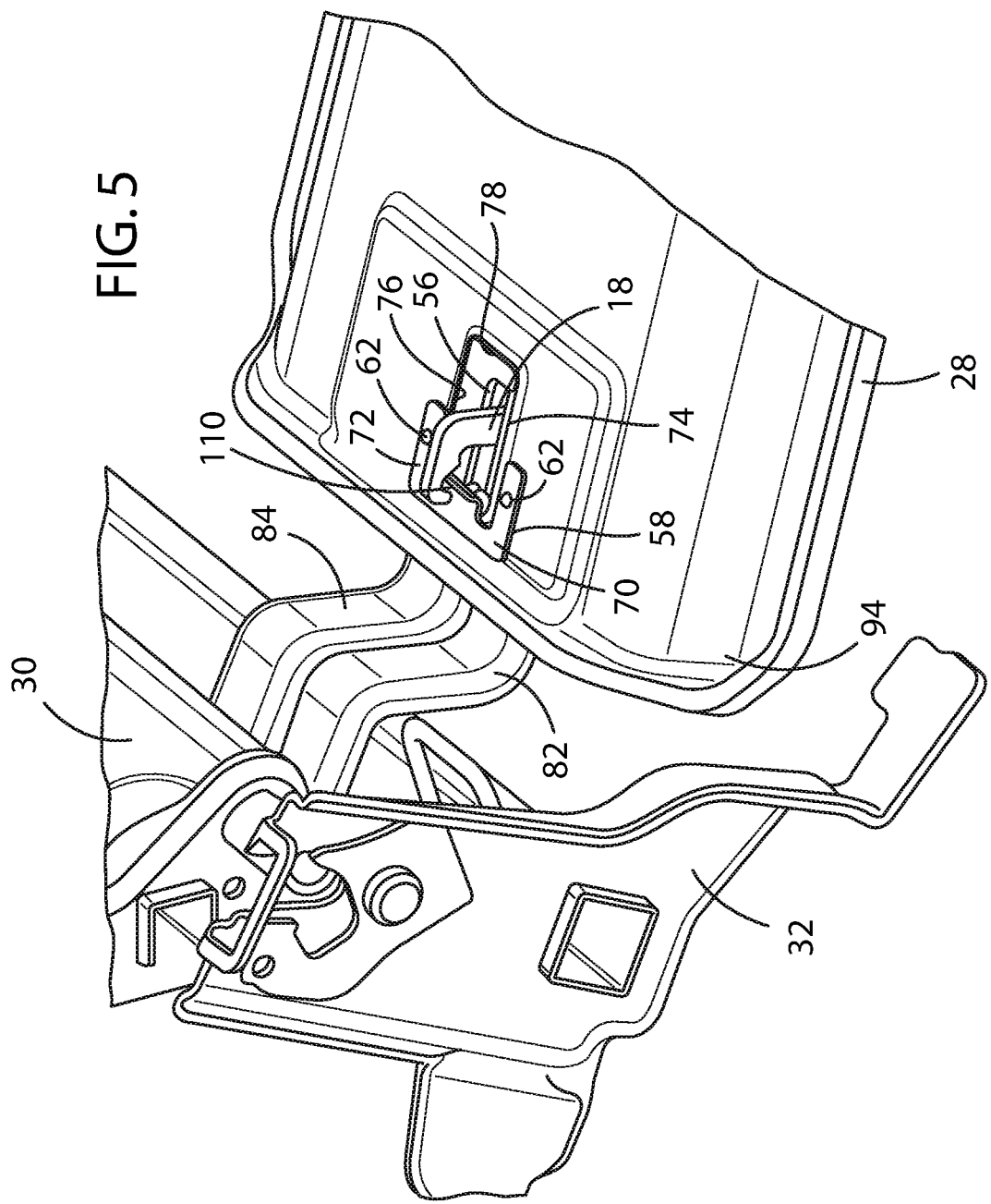
FIG. 5 is an enlarged front side perspective view of a rear portion of the structural member of the flip up lower seat cushion and seat frame of FIG. 1 according to the present disclosure, where the flip up lower seat cushion is in its design seating position capable of supporting a passenger.
Figure 6:
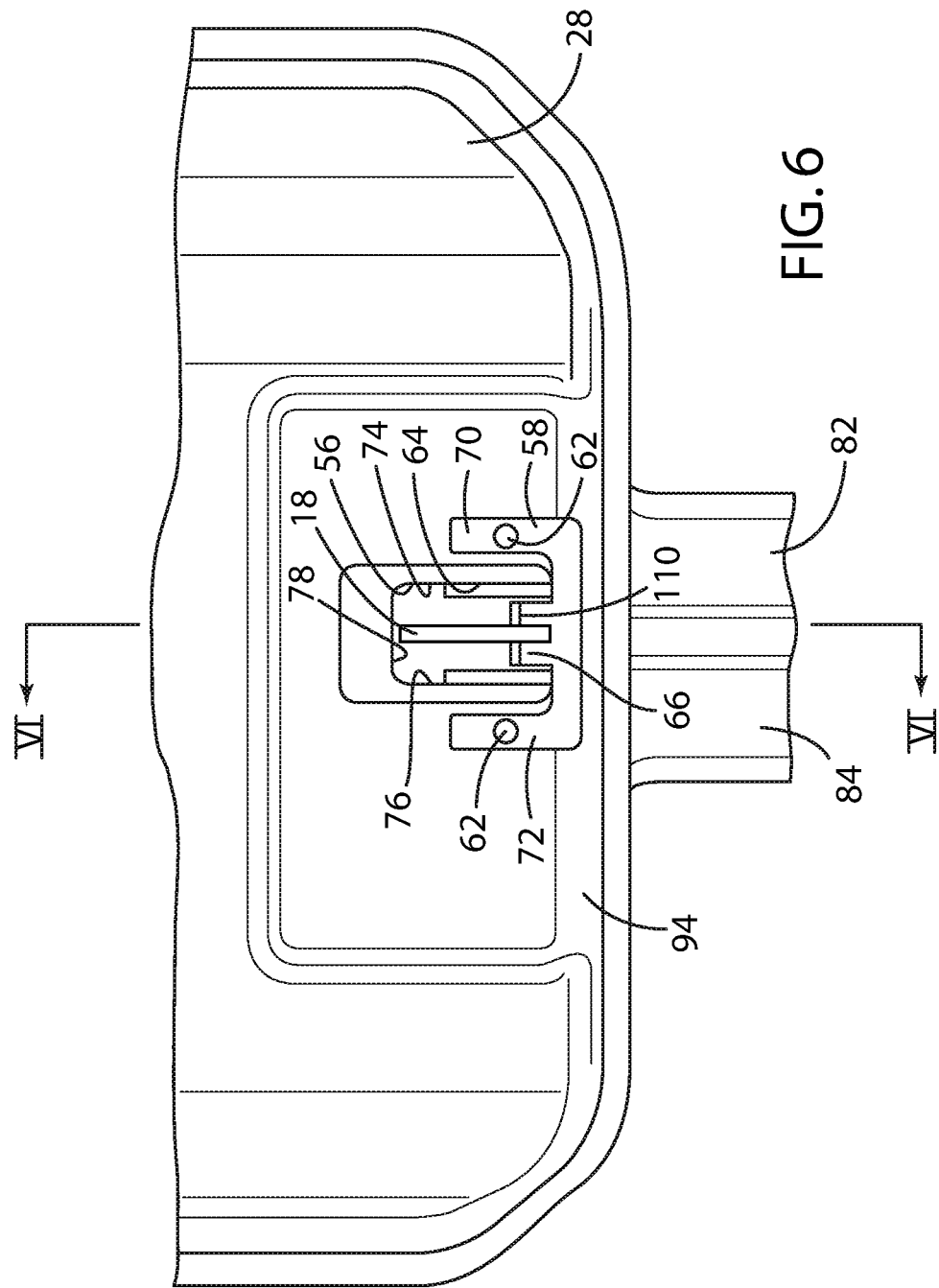
FIG. 6 is a top view of a rear portion of the structural member of the flip up lower seat cushion of FIG. 1 according to the present disclosure, where the flip up lower seat cushion is in its design seating position capable of supporting a passenger.

As best shown in FIG. 5, the cushion stop assembly 58 preferably comprises a cushion stop bracket 60 attached to the structural member 28 of the flip up lower seat cushion 12. The cushion stop bracket 60 may be coupled with the structural member 28 by many different methods, such as fasteners, preferably rivets 62 as best shown in FIG. 5, or welding. The cushion stop bracket 60 is mounted about a rearward portion 64 of the opening 56 in the structural member 28 of the flip up lower seat cushion 12 and includes a catch 66 and an actuator 68. Preferably, the cushion stop bracket 60 further comprises a pair of mounting ears 70, 72 disposed adjacent opposing sides 74, 76 of an outer perimeter 78 of the opening 56, as best shown in FIG. 5. The catch 66 preferably comprises a tongue 80 extending into the opening 56.

Alternatively, the cushion stop assembly 58 may be integrally formed with the structural member 28 of the flip up lower seat cushion 12. In such a construction, the catch 66 and/or the actuator 68 may be formed during the stamping process used in the formation of the structural member 28 of the flip up lower seat cushion 12, where the opening 56, catch 66, and/or actuator 68 are simultaneously stamped with the structural member 28 of the flip up lower seat cushion 12 and a separate cushion stop bracket 60 may be omitted.

The seat frame 32 further comprises a pair of longitudinally extending mounting brackets 82, 84 disposed beneath the flip up lower seat cushion 12 in the design seating position and on either side of the inertia hook 18 to which the inertia hook 18 is pivotally mounted via an inertia hook pivot 86, whereby the inertia hook 18 is pivotally mounted to the seat frame 32. The inertia hook 18 includes a hook member 88 and a hook stop 90. The hook member 88 of the inertia hook 18 extends vertically upward through the opening 56, as best shown in FIGS. 5 and 8-11. A portion of the lower surface 92 of a rear portion 94 of the flip up lower seat cushion 12 beneath the cushion stop assembly 58 forms the actuator 68 and acts against the hook stop 90 that is integrated with the inertia hook 18. Alternatively, the actuator 68 can comprise a lower surface of the cushion stop bracket 60 that acts directly on the hook stop 90. In either case, the actuator 68 preferably comprises a lower surface 92 disposed beneath the cushion stop assembly 58.

As shown, the hook stop 90 of the inertia hook 18 is preferably disposed rearward of the hook member 88 of the inertia hook 18 to form a substantially U-shaped opening 96. The hook stop 90 further preferably comprises a vertically and upwardly extending post 98 disposed rearward of the inertia hook pivot 86. The hook member 88 preferably comprises a vertically and upwardly extending leg 100 disposed forward of the inertia hook pivot 86 and a horizontally and rearwardly extending leg 102 having a distal end 104 curving and extending toward the hook stop 90 and separated therefrom by a slight gap. The distal end 104 of the horizontally and rearwardly extending leg 102 of the hook member 88 of the inertia hook 18 is further preferably provided with a curved notch 106 on a lower surface 108 thereof for engaging an upwardly extending distal end 110 of the tongue 80. According to this configuration, the downwardly facing notch 106 on the distal end 104 of the hook member 88 is in vertical alignment with and adapted to engage the upwardly extending distal end 110 of the tongue 80 on the catch 66 of the cushion stop bracket 60 when the inertia hook 18 is in a first hook position, but readily rotatable out of such vertical alignment to allow the distal end 110 of the tongue 80 of the catch 66 to move through the gap and away from engagement with the distal end 104 of the hook member 88 of the inertia hook 18 as the inertia hook 18 is rotated clockwise to a second hook position, as discussed below.

Figure 8:
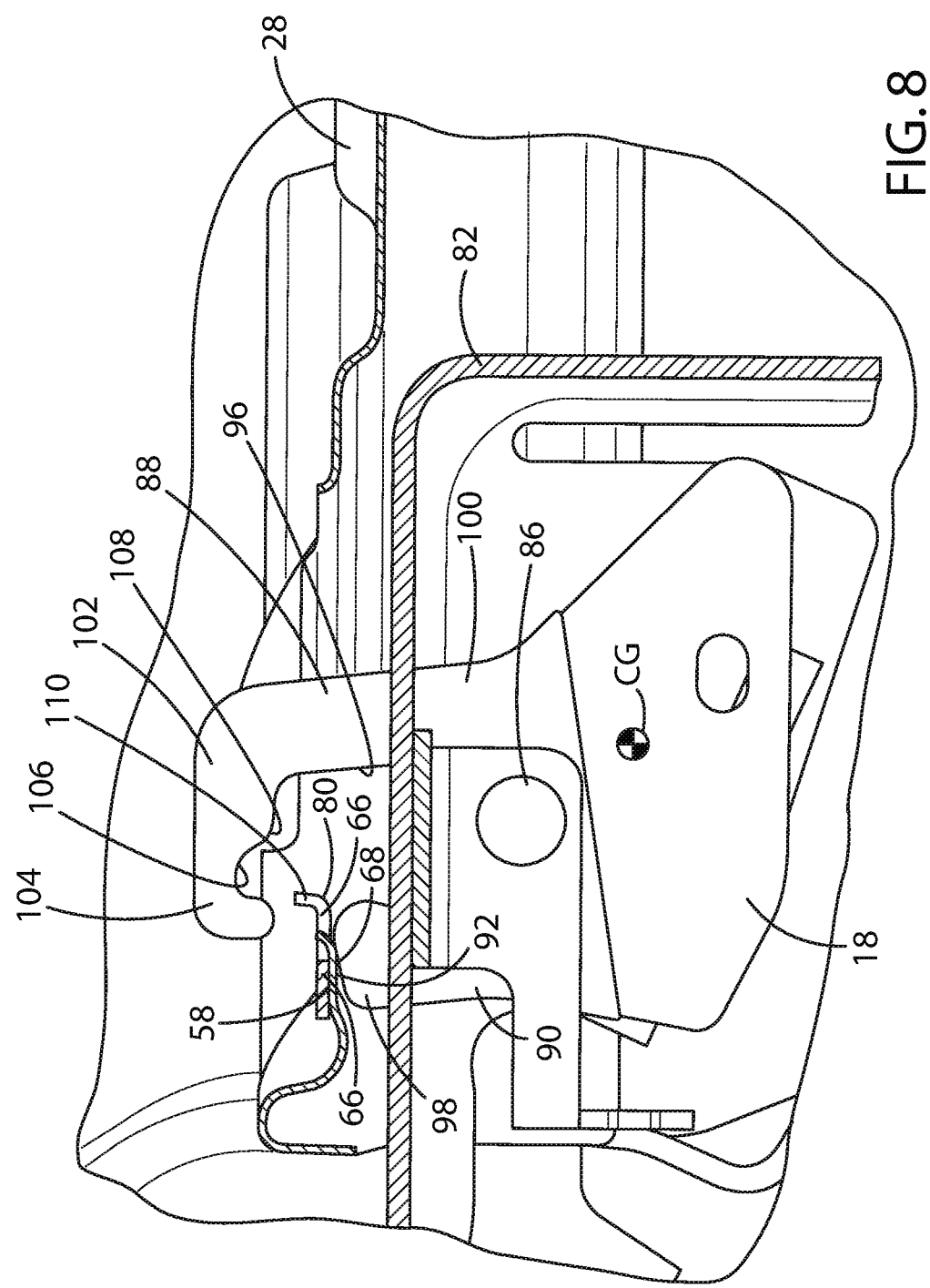
FIG. 8 is a cross-sectional view of a rear portion of the structural member of the flip up lower seat cushion of FIG. 1 according to the present disclosure along the lines VI-VI shown in FIG. 6, where the flip up lower seat cushion is in its design seating position capable of supporting a passenger and the inertia hook is in an engagement position.
Figure 9:
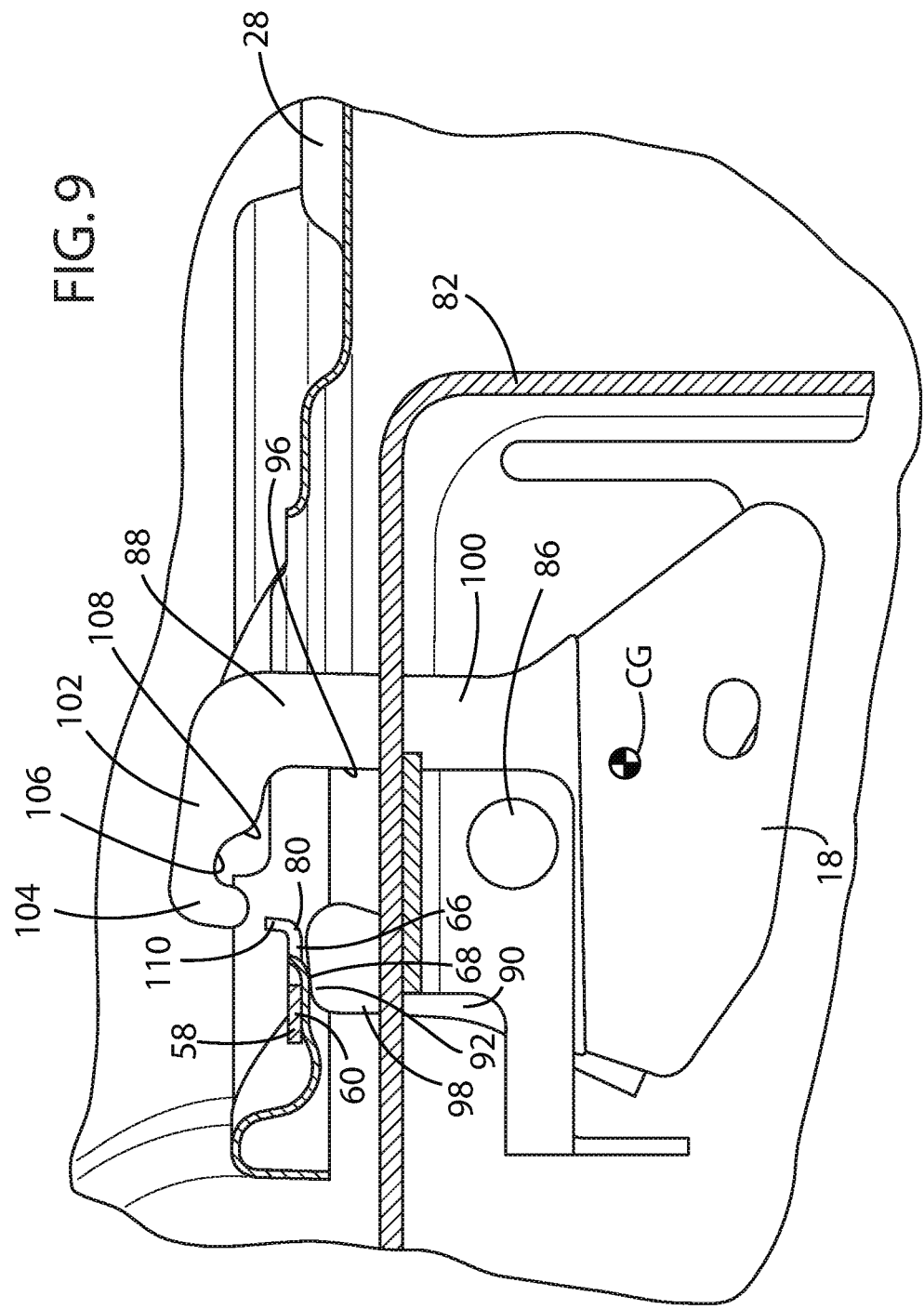
FIG. 9 is a cross-sectional view of a rear portion of the structural member of the flip up lower seat cushion of FIG. 1 according to the present disclosure along the lines VI-VI shown in FIG. 6, where the flip up lower seat cushion has lifted up from its design seating position capable of supporting a passenger due to normal lifting of the flip up lower seat cushion and the inertia hook has begun to rotate out of an engagement position.
Figure 10:
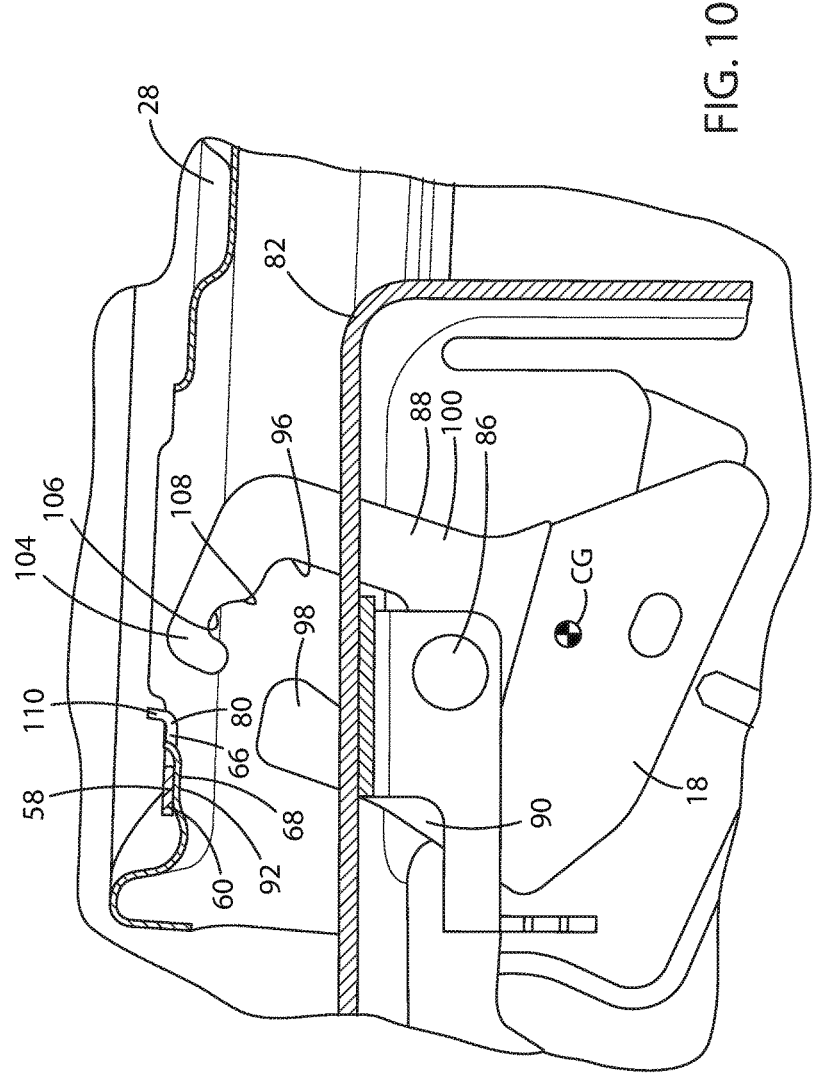
FIG. 10 is a cross-sectional view of a rear portion of the structural member of the flip up lower seat cushion of FIG. 1 according to the present disclosure along the lines VI-VI shown in FIG. 6, where the flip up lower seat cushion has further normally lifted up from its design seating position capable of supporting a passenger due to normal lifting of the flip up lower seat cushion and the inertia hook has completely rotated out of an engagement position to a release position.
Figure 11:
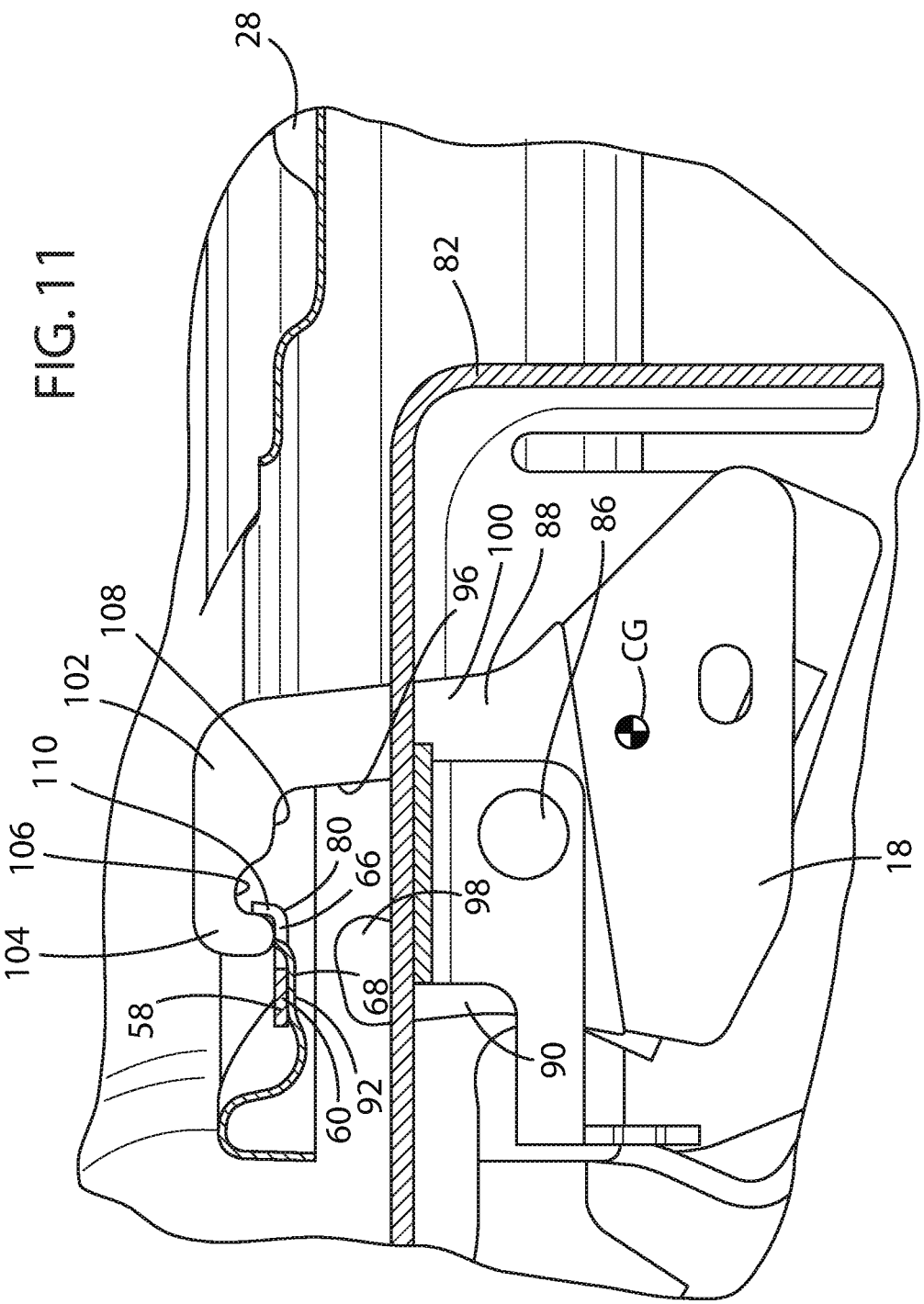
FIG. 11 is a cross-sectional view of a rear portion of the structural member of the flip up lower seat cushion of FIG. 1 according to the present disclosure along the lines VI-VI shown in FIG. 6, where the flip up lower seat cushion has lifted up from its design seating position capable of supporting a passenger due to sudden frontal impact deceleration and the inertia hook is in an engagement position.

With the cushion stop bracket 60 preferably coupled with the flip up lower seat cushion 12, the actuator 68 has a first position in contact with and acting downwardly upon the hook stop 90 to rotate the inertia hook 18 counterclockwise to the first hook position and the hook member 88 into vertical alignment with the catch 66, as shown in FIG. 8. Thus, when the actuator 68 acts upon the hook stop 90, the inertia hook 18 is urged to rotate the hook member 88 counterclockwise into vertical alignment with the catch 66. The actuator 68 also has a second position, when the actuator 68 is lifted away from the hook stop 90 to rotate the inertia hook 18 clockwise to the second hook position and the hook member 88 out of vertical alignment with the catch 66, as shown in FIGS. 9-10.

This arrangement is obtained by situating the hook stop 90 rearward of the inertia hook pivot 86 pivotally attaching the inertia hook 18 to the seat frame 32 and situating a center of gravity CG of the inertia hook 18 forward of the inertia hook pivot 86, at best shown in FIGS. 8-11. The actuator 68, when in the first actuator position, as shown in FIG. 8, is in contact with and acts upon the hook stop 90 to rotate and maintain the hook member 88 in the first hook position in vertical alignment with the catch 66. The first actuator position thus corresponds to the flip up lower seat cushion structural member being in the design seating position.

The actuator 68, when in the second actuator position, is lifted away from the hook stop 90. Since the center of gravity of the inertia hook 18 is disposed forward of the inertia hook pivot 86 and the hook stop 90 is free to move upwardly, gravity causes the inertia hook 18 to rotate the hook member 88 of the inertia hook 18 clockwise into the second hook position out of vertical alignment with the catch 66 to allow the flip up lower seat cushion structural member 28 to be moved to the upright forward flipped position.

As shown in FIG. 3, where a pair of a flip up lower seat cushion structural members 28 are depicted in side-by-side relation, each of the pair of flip up lower seat cushion structural members 28 have a forward edge 50 pivotally coupled with the floor 46 and a rearward edge 54 disposed proximate the seat frame 32. A cushion stop assembly 58 is provided on each of the pair of flip up lower seat cushion structural members 28 proximate the rearward edge 54 of the structural members 28, either singly or in pairs, as shown.

In operation, when it is desired to move the flip up lower seat cushion 12 from its design seating position to the upright forward flipped position, all that is necessary is for the operator to simply lift on the rear portion 94 of the flip up lower seat cushion 12 to rotate the flip up lower seat cushion 12 to its upright forward flipped position. By doing so, the actuator 68 formed by a portion of the lower surface 92 below the cushion stop assembly 58 is lifted off of the hook stop 90. By virtue of the center of gravity CG of the inertia hook 18 being disposed forward of the inertia hook pivot 86 to which the inertia hook 18 is mounted, the inertia hook 18 then begins to rotate clockwise, as shown in FIG. 9. As the inertia hook 18 continues to rotate clockwise as the flip up lower seat cushion 12 is raised further, the distal end 104 of the hook member 88 is brought out of vertical alignment with the distal end 110 of the tongue 80 of the catch 66 of the cushion stop bracket 60. That is, the actuator 68 is moved from its first position, in contact with and acting upon the hook stop 90 to retain the hook member 88 in vertical alignment with the catch 66 when the flip up lower seat cushion structural member 28 is in its design position, to its second position, wherein the actuator 68 is lifted away from the hook stop 90 to rotate the hook member 88 out of such vertical alignment.

As shown in FIG. 10, the flip up lower seat cushion 12 has been further normally lifted up from its design seating position and the inertia hook 18 has completely rotated out of an engagement position to a release position. With the distal end 104 of the hook member 88 of the inertia hook 18 no longer blocking upward movement of the distal end 104 of the tongue 80 of the catch 66 of the cushion stop bracket 60, completion of rotating the flip up lower seat cushion 12 to the upper forward flipped position shown in FIG. 7 can be accomplished unimpeded.

During a frontal impact event, however, the rear portion 94 of the flip up lower seat cushion 12 is abruptly raised, and the upwardly extending distal end 110 of the tongue 80 of the cushion stop bracket 60 is thereby abruptly raised and brought into sudden engagement with the notch 106 under the distal end 104 of the hook member 88 of the inertia hook 18 before the inertia hook 18 begins any clockwise rotation. Preferably, the initial gap or spacing between the distal end 110 of the tongue 80 and the notch 106 of the distal end 104 of the hook member 88, depending on the specific geometry of the inertia hook 18 and hook member 88, is established at a minimal distance in order to prevent any substantial rotation of the inertia hook 18 during an impact event. With the distal end 104 of the hook member 88 engaged with the distal end 110 of the tongue 80, the cushion stop assembly 58 prevents further motion of the flip up lower seat cushion 12 in the upward forward rotational direction.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seating assembly for a motor vehicle comprising;
    a seat frame attached to a floor of the motor vehicle;
    a flip up lower seat cushion having a design seating position and an upright forward flipped position comprising a structural member having a forward edge pivotally coupled with the floor and a rearward edge disposed proximate the seat frame;
    a cushion stop assembly disposed on the structural member of the flip up lower seat cushion and disposed proximate the rearward edge of the structural member of the flip up lower seat cushion, the cushion stop assembly having a catch and an actuator; and
    an inertia hook pivotally mounted to the seat frame comprising a hook member and a hook stop, the inertia hook further having a first hook position when the actuator acts upon the hook stop to rotate the hook member into vertical alignment with the catch and a second hook position when the actuator is lifted away from the hook stop and the hook member rotates out of vertical alignment with the catch.

2. The seating assembly of claim 1, further comprising an upwardly extending seat back cushion comprising a seat back structural member coupled with the seat frame.

3. The seating assembly of claim 2, wherein each of the flip up lower seat cushion and the upwardly extending seat back cushion further comprise an upholstered exterior portion supported by the structural member of the flip up lower seat cushion and the upwardly extending seat back structural member, respectively.

4. The seating assembly of claim 1, wherein the hook stop is disposed rearward of an inertia hook pivot supporting the inertia hook and a center of gravity of the inertia hook is disposed forward of the inertia hook pivot, wherein the actuator has a first actuator position in contact with and acting upon the hook stop to rotate the hook member into the first hook position in vertical alignment with the catch when the flip up lower seat cushion structural member is in the design seating position and a second actuator position wherein the actuator is lifted away from the hook stop and the hook member rotates into the second hook position out of vertical alignment with the catch to allow the flip up lower seat cushion structural member to be moved to the upright forward flipped position.

5. The seating assembly of claim 4, wherein the hook stop of the inertia hook is disposed rearward of the hook member of the inertia hook.

6. The seating assembly of claim 1, further comprising an opening in the structural member of the flip up lower seat cushion through which the hook member of the inertia hook extends vertically upward and wherein the cushion stop assembly is disposed proximate to the opening and the catch is in vertical alignment with the hook member when the inertia hook is rotated to the first hook position.

7. The seating assembly of claim 6, wherein the opening is disposed proximate the rearward edge of the structural member of the flip up lower seat cushion and the catch comprises a tongue extending into the opening.

8. The seating assembly of claim 7, wherein the cushion stop assembly includes a bracket having a pair of mounting ears disposed adjacent opposing sides of an outer perimeter of the opening and the tongue.

9. The seating assembly of claim 7, wherein a distal end of the tongue is curved upwardly and a distal end of the hook member is curved downwardly whereby the distal end of the tongue and the distal end of the hook member are in vertical alignment and adapted to engage each other when the inertia hook is in the first hook position.

10. The seating assembly of claim 4, wherein the seat frame further comprises a pair of mounting brackets disposed beneath the flip up lower seat cushion in the design seating position and on either side of the inertia hook to which the inertia hook is pivotally mounted.

11. The seating assembly of claim 10, wherein the hook stop comprises a vertically and upwardly extending member disposed rearward of the inertia hook pivot and the hook member comprises a vertically and upwardly extending leg disposed forward of the inertia hook pivot and a horizontally and rearwardly extending leg having a distal end, whereby the distal end of the horizontally and rearwardly extending leg of the hook member is in vertical alignment and adapted to engage the catch when the inertia hook is in the first hook position.

12. The seating assembly of claim 11, wherein the actuator comprises a lower surface disposed beneath the cushion stop assembly.

13. A seating assembly comprising;
a structural member pivotally anchored at a forward edge;
a catch and an actuator disposed proximate a rearward edge of the structural member; and
an inertia hook mounted to a stationary seat frame having a first position wherein the actuator urges a hook member into vertical alignment with the catch and a second position wherein the actuator is lifted and the hook member rotates out of vertical alignment with the catch.

14. The seating assembly of claim 13, wherein a hook stop mounted to the inertia hook is disposed rearward of an inertia hook pivot supporting the inertia hook and a center of gravity of the inertia hook is disposed forward of the inertia hook pivot, and wherein the actuator is vertically disposed above and acts upon the hook stop to rotate the hook member into the first position in vertical alignment with the catch and the actuator is lifted away from the hook stop to rotate the hook member into the second position out of vertical alignment with the catch.

15. The seating assembly of claim 14, wherein the structural member further comprises an opening through which the hook member extends vertically upward, the catch extends into the opening, and the catch is in vertical alignment with the hook member when the inertia hook is rotated to the first position.

16. The seating assembly of claim 15, wherein the catch is disposed on a cushion stop bracket coupled with the structural member proximate the opening.

17. A seating assembly for a motor vehicle comprising;
a seat frame attached to a floor of the motor vehicle;
a flip up lower seat cushion structural member having a forward edge pivotally coupled with the motor vehicle and a rearward edge disposed proximate the seat frame;
a cushion stop assembly disposed on and proximate the rearward edge of the flip up lower seat cushion structural member, the cushion stop assembly having a catch and actuator; and
an inertia hook pivotally mounted to the seat frame by an inertia hook pivot, wherein the inertia hook has a hook stop disposed rearward of the inertia hook pivot and a center of gravity disposed forward of the inertia hook pivot, and wherein the actuator has a first position in contact with and acting upon the hook stop to rotate a hook member into vertical alignment with the catch and a second position wherein the actuator is lifted away from the hook stop to rotate the hook member out of vertical alignment with the catch.

18. The seating assembly of claim 17, wherein the seat frame further comprises a pair of mounting brackets disposed beneath the flip up lower seat cushion structural member in a design seating position and on either side of the inertia hook to which the inertia hook is pivotally mounted.

19. The seating assembly of claim 17, further comprising a pair of a flip up lower seat cushion structural members in side by side relation, each of the pair of flip up lower seat cushion structural members having a forward edge pivotally coupled with a floor of the motor vehicle and a rearward edge disposed proximate the seat frame, wherein a cushion stop bracket is attached to each of the pair of flip up lower seat cushion structural members proximate the rearward edge of the pair of flip up lower seat cushion structural members.

20. The seating assembly of claim 19, wherein each flip up lower seat cushion structural member has a design seating position and an upright forward flipped position, and wherein the actuator in the first position is in contact with and acting upon the hook stop to rotate the hook member into vertical alignment with the catch when the flip up lower seat cushion structural member is in the design seating position and the actuator is in the second position wherein the actuator is lifted away from the hook stop to rotate the hook member out of vertical alignment with the catch to allow the flip up lower seat cushion structural member to move to the upright forward flipped position.

* * * * *